(12) United States Patent
Matsumura

(10) Patent No.: US 11,092,050 B2
(45) Date of Patent: Aug. 17, 2021

(54) METHOD AND APPARATUS FOR CONTROLLING EXHAUST GAS PURIFICATION SYSTEM FOR VEHICLE

(71) Applicant: DENSO CORPORATION, Kariya (JP)

(72) Inventor: Yasuhiro Matsumura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/865,700

(22) Filed: May 4, 2020

(65) Prior Publication Data

US 2020/0263591 A1 Aug. 20, 2020

Related U.S. Application Data

(63) Continuation of application No. PCT/JP2018/040563, filed on Oct. 31, 2018.

(30) Foreign Application Priority Data

Nov. 6, 2017 (JP) ............................. JP2017-214167

(51) Int. Cl.
*F01N 3/20* (2006.01)
*F01N 9/00* (2006.01)
*F02D 43/00* (2006.01)
*F02D 13/02* (2006.01)

(52) U.S. Cl.
CPC ............ *F01N 3/2013* (2013.01); *F01N 9/00* (2013.01); *F02D 43/00* (2013.01); *F01N 3/2026* (2013.01); *F01N 2240/16* (2013.01); *F01N 2550/02* (2013.01); *F02D 2013/0292* (2013.01)

(58) Field of Classification Search
CPC .... F01N 3/2006; F01N 3/2013; F01N 3/2026; F01N 2240/16; F02D 41/064
See application file for complete search history.

(56) References Cited

U.S. PATENT DOCUMENTS

| 2003/0070423 | A1 | 4/2003 | Morinaga et al. |
| 2009/0206599 | A1 | 8/2009 | Yamamura et al. |
| 2017/0167342 | A1* | 6/2017 | Balthes ................. F01N 3/2006 |

FOREIGN PATENT DOCUMENTS

| DE | 19753842 A1 * | 6/1999 | ......... B01D 53/9495 |
| EP | 1 898 061 | 3/2008 | |
| JP | 8-86236 | 4/1996 | |
| JP | H10-288028 | 10/1998 | |
| JP | 2000-328992 | 11/2000 | |

(Continued)

OTHER PUBLICATIONS

Machine translation of JP 2014-134187A, accessed Sep. 11, 2020. (Year: 2020).*

(Continued)

*Primary Examiner* — Jonathan R Matthias
(74) *Attorney, Agent, or Firm* — Nixon & Vanderhye P.C.

(57) ABSTRACT

In a control apparatus, a calculation calculates an additional heating amount for an exhaust gas from an internal combustion engine in accordance with an activity of an exhaust purification catalyst in response to the internal combustion engine being required to be started after start of heating of the exhaust purification catalyst by an electric heating device. A drive control unit controls, in accordance with the additional heating amount for the exhaust gas, an amount of heat of the exhaust gas from the internal combustion engine.

12 Claims, 7 Drawing Sheets

(56) References Cited

FOREIGN PATENT DOCUMENTS

| JP | 2010-236544 | 10/2010 | | |
|----|----|----|----|----|
| JP | 2014-134187 | 7/2014 | | |
| WO | WO-2012022762 A1 * | 2/2012 | ........... | F01N 3/2066 |

OTHER PUBLICATIONS

Machine translation of DE-19753842-A1, accessed Feb. 3, 2021. (Year: 2021).*
Machine translation of WO-2012022762-A1, accessed Apr. 8, 2021. (Year: 2021).*

* cited by examiner

METHOD AND APPARATUS FOR CONTROLLING EXHAUST GAS PURIFICATION SYSTEM FOR VEHICLE

CROSS REFERENCE TO RELATED APPLICATION

The present disclosure is a continuation of International Application No. PCT/JP2018/040563, filed Oct. 31, 2018, which claims priority to on Japanese Patent Application No. 2017-214167 filed on Nov. 6, 2017. The contents of these applications are incorporated herein by reference in their entirety.

TECHNICAL FIELD

The present disclosure relates to methods and apparatuses for controlling an exhaust gas purification system for a vehicle.

BACKGROUND

An exhaust system of an internal combustion engine, which will be referred to as engine, installed in a vehicle includes an exhaust purification catalyst for purifying an exhaust gas discharged from the running engine.

SUMMARY

An exemplary aspect of the present disclosure provides a control apparatus for controlling an exhaust gas purification system. The exhaust gas purification system includes a calculation unit configured to calculate an additional heating amount for an exhaust gas from an internal combustion engine in accordance with an activity of an exhaust purification catalyst in response to the internal combustion engine being required to be started after start of heating of the exhaust purification catalyst by an electric heating device. The control apparatus includes a drive control unit configured to control, in accordance with the additional heating amount for the exhaust gas, an amount of heat of the exhaust gas from the internal combustion engine.

BRIEF DESCRIPTION OF THE DRAWINGS

The object described above, other objects, features, and advantages of the present disclosure will become apparent from the following description of embodiments with reference to the accompanying drawings in which.

DESCRIPTION OF EMBODIMENTS

Viewpoint

Figure 1:
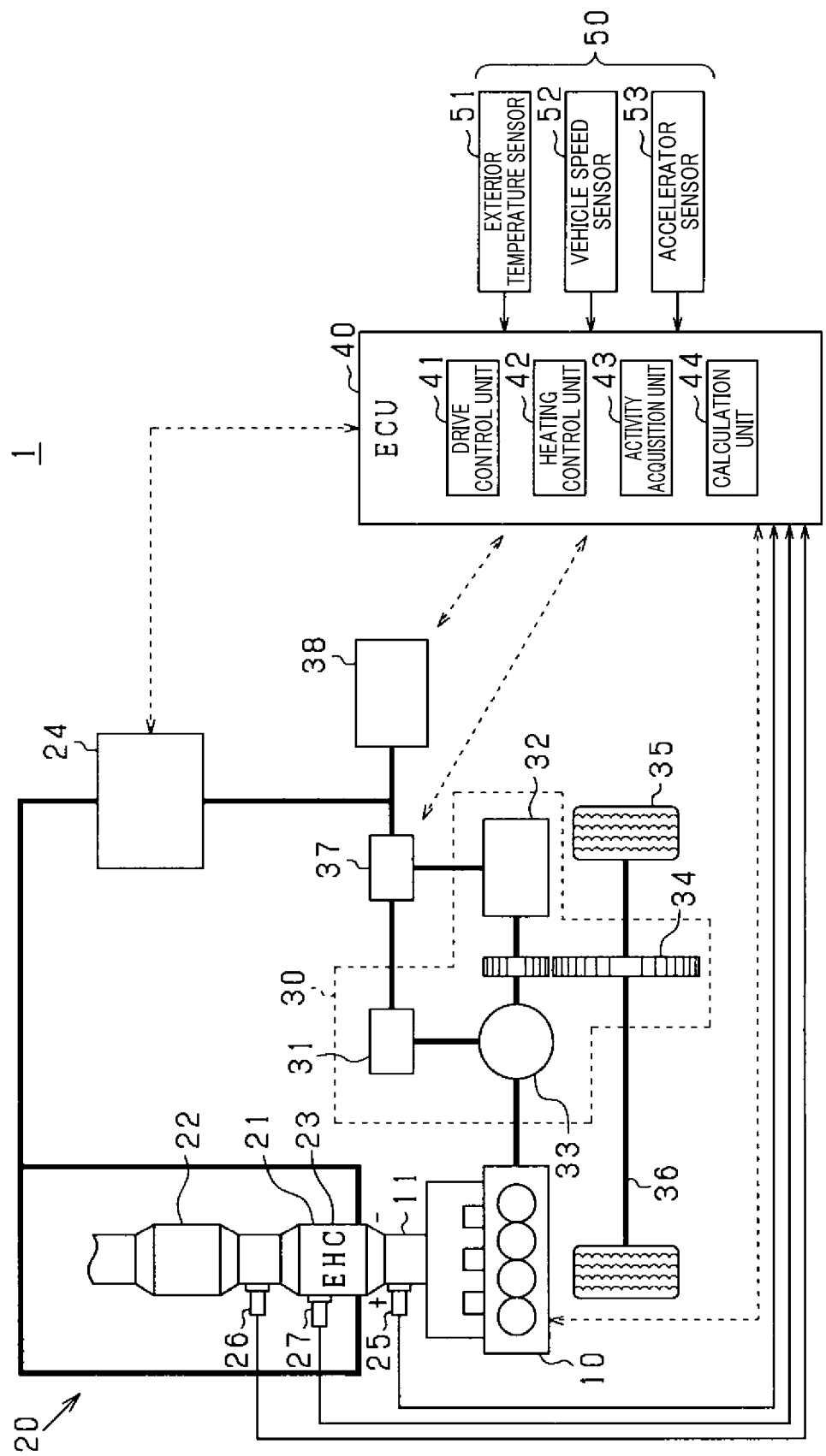
FIG. 1 is a diagram illustrating a configuration of a vehicle drive system that includes a control apparatus for an exhaust gas purification system according to an exemplary embodiment.

An exhaust system of an internal combustion engine, which will be referred to as engine, installed in a vehicle includes an exhaust purification catalyst for purifying an exhaust gas discharged from the running engine. As the exhaust purification catalyst, there is known, for example, a three-way catalyst capable of purifying harmful components such as HC, CO, and NOx.

The activity of the exhaust purification catalyst depends on the temperature of the exhaust purification catalyst. An exhaust purification catalyst whose temperature has not reached its activity temperature may have a negative effect on the engine startup and/or provide insufficient purification of the exhaust gas. Therefore, for starting the engine, the exhaust purification catalyst has preferably been heated to increase the temperature of the exhaust purification catalyst to its activity temperature to thereby sufficiently purify the exhaust gas.

The heating of the exhaust purification catalyst can be performed, for example, by the exhaust gas from the engine, which has passed through the exhaust purification catalyst, or by an electrically heated catalyst (EHC) system for electrically heating the exhaust purification catalyst with a heater or the other similar devices.

Japanese Patent Application Publication No. H10-288028A discloses a technology of heating an exhaust purification catalyst in response to restart of an engine of a hybrid vehicle while the vehicle is travelling upon determination that the temperature of the exhaust purification catalyst is equal to or lower than its activity temperature.

Upon determination that the state of charge (SOC) of a secondary battery is insufficient for heating the exhaust purification catalyst, this technology causes the ignition timing of the engine to be retarded, thus increasing the amount of heat of the exhaust gas. This increase in the amount of heat of the exhaust gas additionally heats the exhaust purification catalyst.

The disclosure of the published patent document determines whether to increase the amount of heat of the exhaust gas from the engine in accordance with whether the SOC of the secondary battery is sufficient upon the temperature of the exhaust purification catalyst being equal to or lower than its activity temperature.

Even if the temperature of the exhaust purification catalyst is remarkably lower than its activity temperature so that the exhaust purification catalyst is required to be heated rapidly, the disclosure of the published patent document may not increase the amount of heat of the exhaust gas from the engine, resulting in the rate of increase in the temperature of the exhaust purification catalyst decelerating.

On the other hand, even if the temperature of the exhaust gas purification is close to the activity temperature, the disclosure of the published patent document may increase the amount of heat of the exhaust gas from the engine upon the SOC of the secondary battery being insufficient. This may excessively increase the temperature of the exhaust gas, resulting in overconsumption of the fuel.

In view of the above problems, the present disclosure aims to provide methods and apparatuses for controlling an exhaust gas purification system for a vehicle, each of which is capable of quickly heating an exhaust purification catalyst while reducing fuel consumption in accordance with the activation level, i.e. the degree of activity, of the exhaust purification catalyst.

The present disclosure provides a control apparatus for controlling an exhaust gas purification system. The exhaust gas purification system includes an exhaust purification catalyst disposed in an exhaust passage of an internal combustion engine of a vehicle, and an electric heating device for heating the exhaust purification catalyst based on supplied electric power. The control apparatus includes an activity acquisition unit configured to acquire an activity of the exhaust purification catalyst, and a heating control unit configured to cause the electric heating device to heat the exhaust purification catalyst in accordance with the activity of the exhaust purification catalyst in response to an ignition operation of the vehicle. The control apparatus includes a calculation unit configured to calculate an additional heating amount for an exhaust gas from the internal combustion engine in accordance with the activity of the exhaust purification catalyst in response to the internal combustion engine being required to be started after start of heating of the exhaust purification catalyst by the electric heating device. The control apparatus includes a drive control unit configured to control, in accordance with the additional heating amount for the exhaust gas, an amount of heat of the exhaust gas from the internal combustion engine.

According to the present disclosure, the exhaust purification catalyst is quickly heated by the electric heating device in accordance with the activity of the exhaust purification catalyst. The calculation unit calculates the additional heating amount for the exhaust gas from the internal combustion engine in accordance with the activity of the exhaust purification catalyst in response to the internal combustion engine being required to be started after start of heating of the exhaust purification catalyst by the electric heating device. The drive control unit controls, in accordance with the additional heating amount for the exhaust gas, the amount of heat of the exhaust gas from the internal combustion engine.

This configuration makes it possible to suitably control, in accordance with the activity of the exhaust purification catalyst, both 1. The amount of heat to be applied by the electric heating device to the exhaust gas 2. The amount of heat of the exhaust gas This therefore enables quick heating of the exhaust purification catalyst while enabling reduction in the fuel consumption.

In addition, the present disclosure provides a method of controlling an exhaust gas purification system, which is implementable by the above control apparatus.

The method includes the steps of

1. Acquiring an activity of the exhaust purification catalyst

2. Heating, using the electric heating device, the exhaust purification catalyst in accordance with the activity of the exhaust purification catalyst in response to an ignition operation of the vehicle 3. Calculating an additional heating amount for the exhaust gas from the internal combustion engine in accordance with the activity of the exhaust purification catalyst in response to a request for starting the internal combustion engine 4. Controlling, in accordance with the additional heating amount for the exhaust gas, an amount of heat of the exhaust gas from the internal combustion engine

EMBODIMENTS

As illustrated in FIG. 1, a drive system 1 for a vehicle includes an internal combustion engine 10, which will be referred to simply as an engine 10, an exhaust gas purification system 20 for purifying exhaust gas from the engine 10, a power mechanism 30, an inverter 37, a high-voltage battery 38, and a control apparatus 40.

The power mechanism 30 includes a first motor generator (hereinafter, mentioned as a "first MG") 31, a second motor generator (hereinafter, mentioned as a "second MG") 32, a power splitter 33, and a reduction gear mechanism 34. Mainly the engine 10 and the second MG 32 each serve as a power engine for driving wheels 35 of the vehicle. The engine 10 includes a crankshaft, and each of the first and second MGs 31 and 32 includes a rotation shaft, and the crankshaft of the engine 10, the rotation shaft of the first MG 31, and the rotation shaft of the second MG 32 are coupled with each other via the power splitter 33 serving as a power division mechanism. The power splitter 33 is comprised of, for example, a planetary gear mechanism. The rotation shaft of the second MG 32 is coupled with an axle 36 of the vehicle via the reduction gear mechanism 34.

The first MG 31 and the second MG 32 are connected to the high-voltage battery 38 via the inverter 37. Each of the first MG 31 and the second MG 32 is configured to supply electric power to the other thereof via the inverter 37, and receive electric power from the other thereof via the inverter 37.

The exhaust gas purification system 20 includes an exhaust purification catalyst layer 21 and a particle removal layer 22 that are disposed in an exhaust passage 11 of the engine 10. The exhaust purification catalyst layer 21 includes an exhaust purification catalyst such as a three-way catalyst. The particle removal layer 22 includes, for example, a gasoline particulate filter (GPF) or a four-way GPF that includes a GPF and a catalyst supported by the GPF. The particle removal layer 22 is operative to remove particulate matters in the exhaust gas.

Note that, in FIG. 1, the single exhaust purification catalyst layer 21 and the single particle removal layer 22 are disposed in the exhaust passage 11 such that the single exhaust purification catalyst layer 21 is located upstream of the single particle removal layer 22, and the single particle removal layer 22 is located downstream of the single exhaust purification catalyst layer 21. A plurality of exhaust purification catalyst layers 21 can be used, and similarly a plurality of particle removal layers 22 can be used. The order of the layers 21 and 22 in the exhaust passage 11 is not limited to the order of the layer(s) 21 and layer(s) 22 from the upstream of the exhaust passage 11 to the downstream thereof. The particle removal layer 22 may be eliminated depending on the purification ability of the exhaust purification catalyst layer 21.

In FIG. 1, the exhaust purification catalyst layer 21 and the particle removal layer 22 are disposed to be closer to an end of the exhaust passage 11 coupled to the engine 10, but can be disposed to be closer to the other end of the exhaust passage 11. Locating the exhaust purification catalyst layer 21 and the particle removal layer 22 to be farther than the engine 10 enables the temperature of the exhaust gas passing through the layers 21 and 22 to decrease, resulting in reduction in pressure loss of the exhaust gas.

The exhaust purification catalyst layer 21 includes an EHC 23 serving as an electric heating device. A power supply circuit 24 is provided for the EHC 23. The EHC 23, which constitutes the exhaust purification catalyst layer 21, is comprised of a conductive resistor serving as a support and the exhaust purification catalyst supported by the conductive resistor, and is connected to the power supply circuit 24. The high-voltage battery 38 supplies electric power to the EHC 23 via the power supply circuit 24 to the EHC 23. This power supply to the EHC 23 energizes the conductive resistor of the EHC 23, and energization of the conductive resistor causes the conductive resistor to serve as a heater, enabling the exhaust purification catalyst layer 21 including the exhaust purification catalyst to be heated.

In the exhaust purification catalyst layer 21, the exhaust purification catalyst may be entirely supported by the conductive resistor of the EHC 23 or may be partially supported by the conductive resistor of the EHC 23.

For example, the support for the exhaust purification catalyst can be comprised of the conductive resistor and a non-conductive member; the conductive resistor is arranged upstream of the non-conductive member. This enables an upstream part of the exhaust purification catalyst supported by the conductive resistor to be heated by the EHC 23. Energization of the EHC 23 causes the exhaust purification catalyst layer 21 to be entirely heated. This therefore enables another part of the exhaust purification catalyst, which is unsupported by the conductive resistor of the EHC 23, to be indirectly heated.

The present embodiment describes the EHC 23 as an example of the electric heating device, but another device, which is comprised of a mechanism capable of heating the exhaust purification catalyst when energized, can be used as the electric heating device.

The electric power supplied to the EHC 23 is controlled by the power supply circuit 24. The power supply circuit 24 includes an energization power control unit (not shown) that includes a switching circuit and another circuit component, and the energization power control unit converts the voltage of the electric power supplied from the high-voltage battery 38 into another voltage, and/or smoothens the voltage of the electric power or the converted voltage, and supplies the converted and/or smoothened voltage of the electric power to the EHC 23.

The exhaust gas purification system 20 includes exhaust gas sensors 25 and 26 respectively disposed at an inlet and an outlet of the exhaust purification catalyst layer 21. The exhaust gas purification system 20 includes a temperature sensor 27 provided to the exhaust purification catalyst layer 21 and configured to detect the temperature of the exhaust gas passing through the EHC 23. Each of the exhaust gas sensors 25 and 26 is an exhaust gas sensor, such as an air-fuel ratio sensor, an oxygen sensor, or another sensor, for measuring the air-fuel ratio of the exhaust gas, whether the exhaust gas is rich or lean, and/or the other parameters of the exhaust gas.

The control apparatus 40 is an electronic control unit (ECU) and is formed of mainly a microcomputer. The control apparatus 40 includes a drive control unit 41, a heating control unit 42, an activity acquisition unit 43, and a calculation unit 44.

The drive control unit 41 controls the engine 10 and controls the inverter 37 to control the first MG 31 and the second MG 32 according to the drive conditions of the vehicle.

The heating control unit 42 controls the power supply circuit 24 to control the energization power to be supplied to the EHC 23.

The activity acquisition unit 43 acquires the activity of the exhaust purification catalyst.

The calculation unit 44 calculates, based on the activity of the exhaust purification catalyst, an additional heating amount for the exhaust gas from the engine 10, in response to a request for starting the engine 10.

The drive control unit 41 controls the amount of heat of the exhaust gas from the engine 10 in accordance with the additional heating amount for the exhaust gas calculated by the calculation unit 44.

The control apparatus 40 receives signals inputted respectively from various sensors 50 mounted on the vehicle.

The various sensors 50 can include, for example, an exterior temperature sensor 51, a vehicle speed sensor 52 for measuring the speed of the vehicle, and an accelerator sensor 53 for measuring a selected position of an accelerator corresponding to an operated position of an accelerator pedal.

The control apparatus 40 may also receive signals inputted from, for example, a shift switch and a brake switch. The shift switch measures an operated position of a shift lever, and the brake switch measures an operation of a brake.

For power running of the vehicle, the control apparatus 40 is configured to cause the power splitter 33 to divide motive power of the engine 10 into first motive power for a first system including the first MG 31 and second motive power for a second system including the axel 36 of the vehicle. The first motive power drives the first MG 31 to thereby cause the first MG 31 to generate electric power, and the generated electric power drives the second MG 32, and the second motive power rotatably drives the axel 36 of the vehicle to thereby rotatably drive the driving wheels 35. The electric power generated by the first MG 31 drives the second MG 32 to thereby cause the second MG 32 to rotatably drive the axel 36 of the vehicle, thus rotatably driving the driving wheels 35.

For rapid acceleration of the vehicle, the control apparatus 40 is configured to supply, in addition to the electric power generated by the first MG 31, electric power of the high-voltage battery 38 to the second MG 32, thus increasing the drive power of the second MG 32.

For slowing down of the vehicle, the control apparatus 40 is configured to perform a regeneration task, i.e. a regenerative braking task, which drives the second MG 32 based on motive power of the driving wheels 35 to cause the second MG 32 to serve as a power generator, thus converting kinetic energy of the vehicle into electric power and storing the converted electric power in the high-voltage battery 38. This charges the high-voltage battery 38.

During startup of the vehicle or periods of low-load of the vehicle, the control apparatus 40 drives the second MG 32 based on the electric power of the high-voltage battery 38 while maintaining the stopped state of the engine 10 to thereby cause the second MG 32 to generate motive power. This rotatably drives the driving wheels 35 based on the motive power generated by the second MG 32, thus causing the vehicle to travel in an electric vehicle (EV) mode. Note that the periods of low-load of the vehicle represent periods during which the vehicle is in lower fuel efficiency.

For startup of the engine 10, the control apparatus 40 causes the first MG 31 to be driven based on the electric power of the high-voltage battery 38, so that the motive power generated by the first MG 31 is transmitted to the crankshaft via the power splitter 33. This rotatably drives the crankshaft of the engine 10, thus starting the engine 10.

The heating control unit 42 energizes the EHC 23 as necessary to heat the exhaust purification catalyst for startup of the engine 10. During driving of the engine 10, the exhaust gas from the engine 10 passes through the exhaust purification catalyst layer 21 and the particle removal layer 22. This may result in the exhaust purification catalyst layer 21 being heated by the exhaust gas.

The heating control unit 42 may determine whether to energize the EHC 23 on the basis of the activity of the exhaust purification catalyst acquired by the activity acquisition unit 43.

The activity acquisition unit 43 may determine the activity of the exhaust purification catalyst, for example, on the basis of the temperature of the exhaust purification catalyst layer 21 detected by the temperature sensor 27. The temperature of the exhaust purification catalyst layer 21 detected by the temperature sensor 27 can be regarded as the temperature of the exhaust purification catalyst supported by the exhaust purification catalyst layer 21. The activity acquisition unit 43 may also determine the activity of the exhaust purification catalyst on the basis of the quantity of at least one purification target component, such as NOx or HC, contained in the exhaust gas at each of the inlet and the outlet of the exhaust purification catalyst layer 21 that is detected by the corresponding one of the exhaust gas sensors 25 and 26. The activity of the exhaust purification catalyst depends on the temperature of the exhaust purification catalyst. An exhaust purification catalyst, whose temperature that has not reached its predetermined activity temperature, may have a negative effect on the engine startup and/or provide insufficient purification of the exhaust gas.

The activity of the exhaust purification catalyst can be evaluated using, for example, a NOx purification ability of the exhaust purification catalyst. The NOx purification ability of the exhaust purification catalyst represents an indicator defining that the maximum purification ability of the catalyst is set to 100%.

Figure 2:
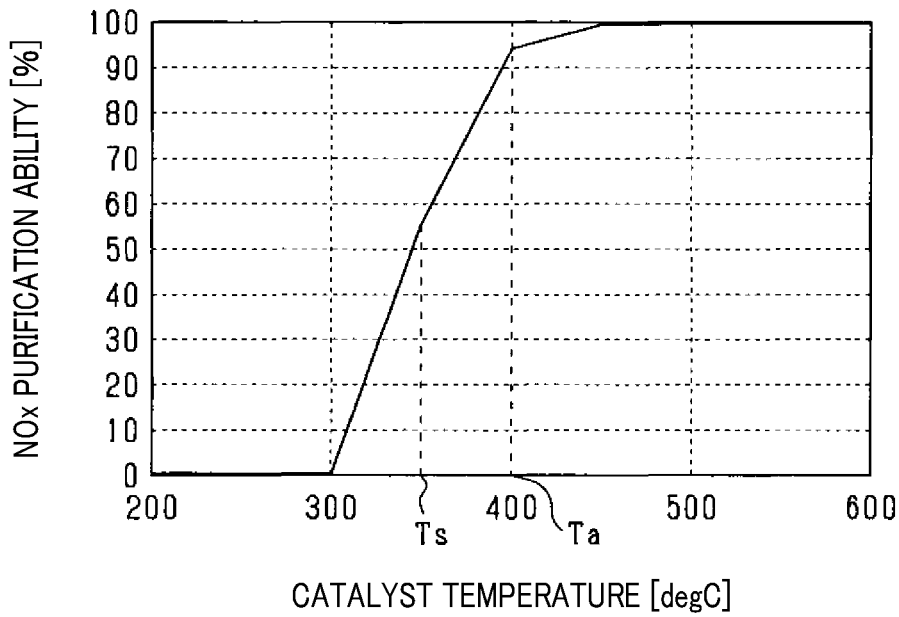
FIG. 2 is a graph illustrating a relationship between an activity and a temperature of an exhaust purification catalyst.

As illustrated in FIG. 2, the NOx purification ability of the exhaust purification catalyst depends on the temperature T of the exhaust purification catalyst. In particular, the NOx purification ability of the exhaust purification catalyst rapidly increases when the temperature T of the exhaust purification catalyst is within a temperature range from about 300° C. to about 400° C.

Here, a value of the temperature T of the exhaust purification catalyst when the NOx purification ability of the exhaust purification catalyst becomes 95% is defined as a totally active temperature Ta, and a value of the temperature T of the exhaust purification catalyst when the NOx purification ability of the exhaust purification catalyst becomes 50% is defined as a semi active temperature Ts.

That is, the activity of the exhaust purification catalyst changes depending on the temperature T of the exhaust purification catalyst.

When a value of the temperature T of the exhaust purification catalyst is lower than the semi active temperature Ts (T<Ts), the exhaust purification catalyst can be evaluated to be inactive. When a value of the temperature T of the exhaust purification catalyst is equal to or higher than the semi active temperature Ts and lower than the totally active temperature Ta (Ts≤T<Ta), the exhaust purification catalyst can be evaluated to be semi-active or half-active. When a value of the temperature T of the exhaust purification catalyst is equal to or higher than the totally active temperature Ta (T≥Ta), the exhaust purification catalyst can be evaluated to be totally active.

Note that the NOx purification ability of the exhaust purification catalyst is one example of the indicator for the activity of the exhaust purification catalyst. A purification ability for another purification target component, such as a hydrocarbon component or CO, contained in the exhaust gas may also be used as the indicator for the activity of the exhaust purification catalyst.

The heating control unit 42 may be configured to calculate, as an energy deficiency E, energy that is required for the temperature T of the exhaust purification catalyst to have reached the totally active temperature Ta in accordance with the temperature difference between a measured value by the temperature sensor 27 and the totally active temperature Ta. Then, the heating control unit 42 may be configured to energize the EHC 23 in accordance with the magnitude of the energy deficiency E.

As another example, the heating control unit 42 may be configured to energize the EHC 23 at a predetermined output voltage when a level of the activity of the exhaust purification catalyst is the semi activity level or the non-activity level, or not to energize the EHC 23 when a level of the activity of the exhaust purification catalyst has reached a totally active level.

The heating control unit 42 may also determine whether to electrify the EHC 23 using another indicator in addition to the activity of the exhaust purification catalyst. For example, in order to protect the high-voltage battery 38, the heating control unit 42 may energize the EHC 23 only when the exterior temperature or the SOC of the high-voltage battery 38 is equal to or higher than a corresponding predetermined value.

The calculation unit 44 calculates an additional heating amount for the exhaust gas from the engine 10 as a function of the activity of the exhaust purification catalyst acquired by the activity acquisition unit 43 in response to a request for starting the engine 10.

Note that the additional heating amount for the exhaust gas represents an extra amount of heat to be added to a normal amount of heat of the exhaust gas; the normal amount of heat of the exhaust gas is determined based on predetermined normal drive conditions of the engine 10.

No addition of heat to the exhaust gas results in no rise in the temperature of the exhaust purification catalyst.

The calculation unit 44 preferably reduces the additional heating amount for the exhaust gas in accordance with the rise in the activity of the exhaust purification catalyst. Because the energy deficiency E decreases with an increase in the activity of the exhaust purification catalyst, the calculation unit 44 preferably reduces the additional heating amount for the exhaust gas as the energy deficiency E decreases.

Figure 3:
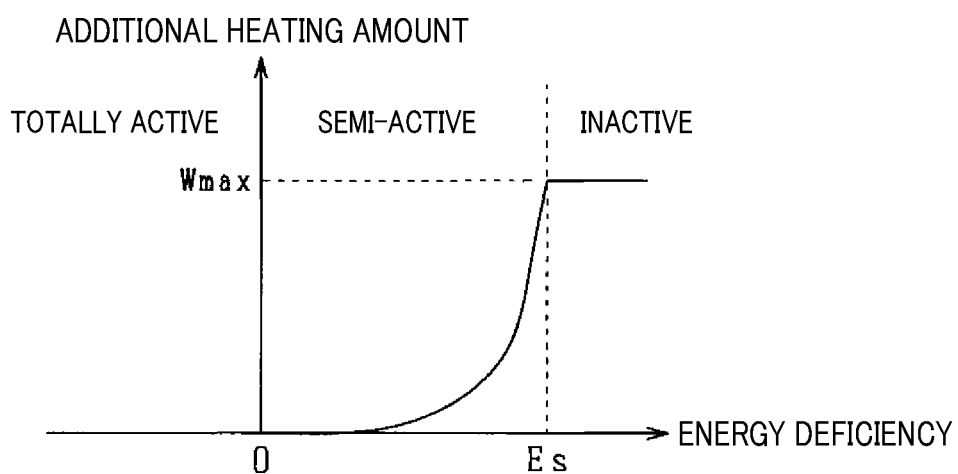
FIG. 3 is a graph illustrating a relationship between the amount of heat of an exhaust gas and an energy deficiency.

If the additional heating amount for the exhaust gas from the engine 10 is excessively large, this may have a negative effect on driving of the engine 10. For this reason, as illustrated in FIG. 3, the additional heating amount for the exhaust gas is preferably set to its maximum Wmax acceptable by the engine 10 when the energy deficiency E has exceeded a predetermined energy level Es so that the exhaust purification catalyst is inactive. The energy level Es represents a level of the energy deficiency E required when the temperature T of the exhaust purification catalyst is the semi-active temperature Ts.

The maximum Wmax for the additional heating amount for the exhaust gas acceptable by the engine 10 is determined to prevent at least one of 1. The fuel efficiency of the engine 10 from being excessively deteriorated 2. The amount of emissions in the exhaust gas of the engine 10 from being excessively deteriorated 3. The amount of emissions in the exhaust gas at the outlet of the exhaust purification catalyst layer 21 from being excessively deteriorated When the energy deficiency E is a positive value equal to or lower than the predetermined energy level Es so that the exhaust purification catalyst is semi-active, it is preferable to change the additional heating amount for the exhaust gas in accordance with change in the activity of the exhaust purification catalyst and/or change in the energy deficiency E.

In particular, it is possible to cause the additional heating amount for the exhaust gas to follow change in the activity of the exhaust purification catalyst or change in the energy deficiency E. It is also possible to stepwise change the additional heating amount for the exhaust gas each time the activity of the exhaust purification catalyst or the energy deficiency E exceeds any of predetermined multi thresholds.

Further, the calculation unit 44 may calculate the additional heating amount for the exhaust gas in accordance with the speed of the vehicle and/or the acceleration of the vehicle in addition to the activity of the exhaust purification catalyst.

Specifically, the calculation unit 44 may calculate the additional heating amount for the exhaust gas in accordance with a value measured by the vehicle speed sensor 52 and/or a value measured by the accelerator sensor 53. Moreover, the calculation unit 44 may calculate the additional heating amount for the exhaust gas in accordance with the energy deficiency E and/or an amount of energy discharged from the exhaust purification catalyst layer 21.

Figure 4:
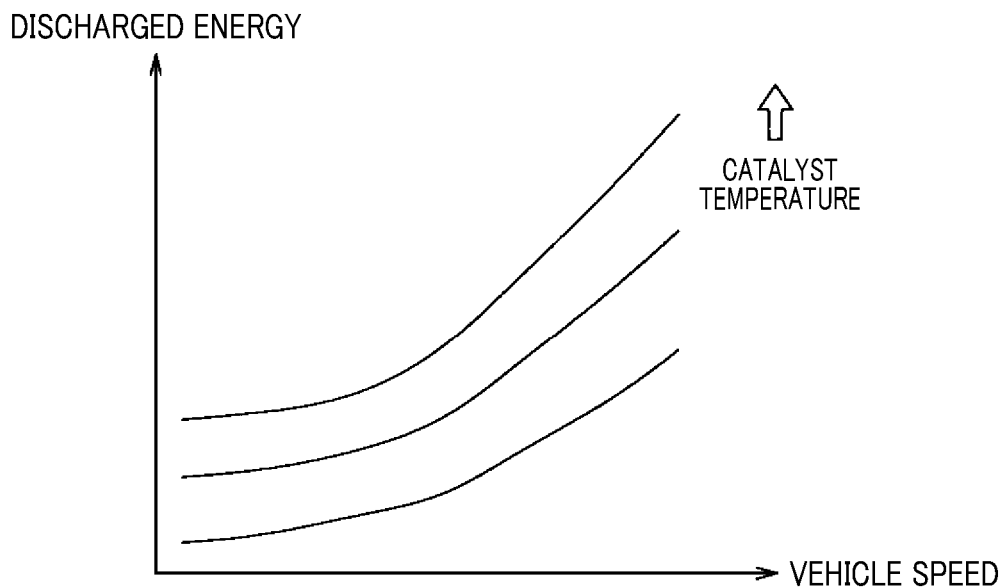
FIG. 4 is a graph illustrating a relationship between discharged energy and a speed of a vehicle.

As illustrated in FIG. 4, the amount of energy discharged from the exhaust purification catalyst layer 21 increases as the speed of the vehicle increases, and also increases as the temperature T of the exhaust purification catalyst increases. From these correlations, the calculation unit 44 is capable of calculating the amount of energy discharged from the exhaust purification catalyst layer 21 in accordance with the speed of the vehicle measured by the vehicle speed sensor 52 and the temperature T of the exhaust purification catalyst calculated using the temperature sensor 27.

The calculation unit 44 may also calculate the additional heating amount for the exhaust gas in accordance with the quantity of at least one purification target component contained in the exhaust gas from the engine 10.

Figure 5A:
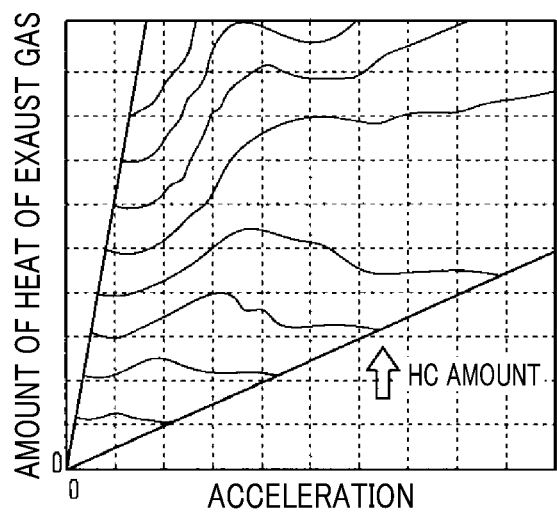
FIGS. 5(*a*) and 5(*b*) are graphs each illustrating a relationship among the amount of head of the exhaust gas, an acceleration, and the amount of HC in the exhaust gas when the exhaust purification catalyst is semi-active.
Figure 5B:
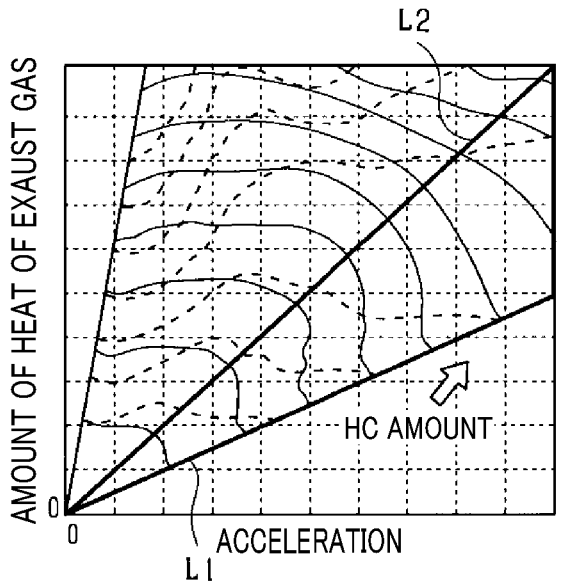

For example, the quantity of the hydrocarbon (HC) component in the exhaust gas changes depending on the amount of heat of the exhaust gas and the acceleration of the vehicle (see FIGS. 5(a) and 5(b)).

Note that FIG. 5(a) illustrates a quantity of HC component in the exhaust gas discharged from the engine 10 for each of the amounts of heat for the exhaust gas using a corresponding one of solid contours. These contours, each of which represents the quantity of HC component in the exhaust gas discharged from the engine 10, are arranged in ascending order along an arrow in FIG. 5(a). In addition, FIG. 5(b) illustrates a quantity of HC component in the exhaust gas at the outlet of the exhaust purification catalyst layer 21 using a corresponding one of solid contours. These contours, each of which represents the quantity of HC component in the exhaust gas at the outlet of the exhaust purification catalyst layer 21, are arranged in ascending order along an arrow in FIG. 5(b). In FIG. 5(b), dotted contours represent the respective contours illustrated in FIG. 5(a).

A straight line L1 in FIG. 5(b) represents that the additional heating amount for the exhaust gas is set to zero, and a straight line L2 represents the maximum (see Wmax in FIG. 3) for the additional heating amount for the exhaust gas.

As illustrated in FIG. 5(a), the quantity of the HC component in the exhaust gas discharged from the engine 10 increases as the amount of heat of the exhaust gas increases. Additionally, as illustrated in FIG. 5(b), the quantity of the HC component in the exhaust gas at the outlet of the exhaust purification catalyst layer 21 increases as the acceleration of the vehicle increases.

The acceleration of the vehicle is proportional to the actual position of an accelerator of the vehicle, so that the calculation unit 44 preferably calculates, the value measured by the accelerator sensor 53, the additional heating amount for the exhaust gas while the quantity of the HC component is relatively low. When the amount of heat of the exhaust gas, i.e. the calorific value of the exhaust gas, is smaller than the straight line L1, it may be difficult to heat the exhaust purification catalyst based on the exhaust gas.

When the amount of heat of the exhaust gas is larger than the straight line L2, the fuel efficiency may be excessively deteriorated or the mount of the HC in the exhaust gas may be excessively increased.

For this reason, the additional heating amount for the exhaust gas is preferably calculated so that the total amount of heat of the exhaust gas is located in a region between the straight lines L1 and L2.

Specifically, for example, when the level of the activity of the exhaust purification catalyst is within the range of inactive levels, it is preferably to calculate the additional heating amount for the exhaust gas so that the total amount of heat of the exhaust gas relative to the acceleration is located on the straight line L2.

As another example, when the level of the activity of the exhaust purification catalyst is within the range of semi-active levels, it is preferably to 1. Calculate the additional heating amount for the exhaust gas so that the total amount of heat of the exhaust gas, which includes the additional heating amount, relative to the acceleration is located in the region between the straight lines L1 and L2

2. Reduce the total amount of heat of the exhaust gas to be smaller from the straight line L2 to the straight line L1 as the activity of the exhaust gas becomes closer to the totally active level based on heating of the exhaust gas The drive control unit 41 performs control for increasing the amount of heat of the exhaust gas from the internal combustion engine 10 in accordance with the additional heating amount calculated by the calculation unit 44. For example, the drive control unit 41 is capable of increasing an ignition retard position of the engine 10 from a usual controlled position, a target idling speed of the engine 10 from a usual controlled speed, and/or a required amount of electric power from a usual controlled amount, thus increasing the amount of heat of the exhaust gas.

Figure 6:
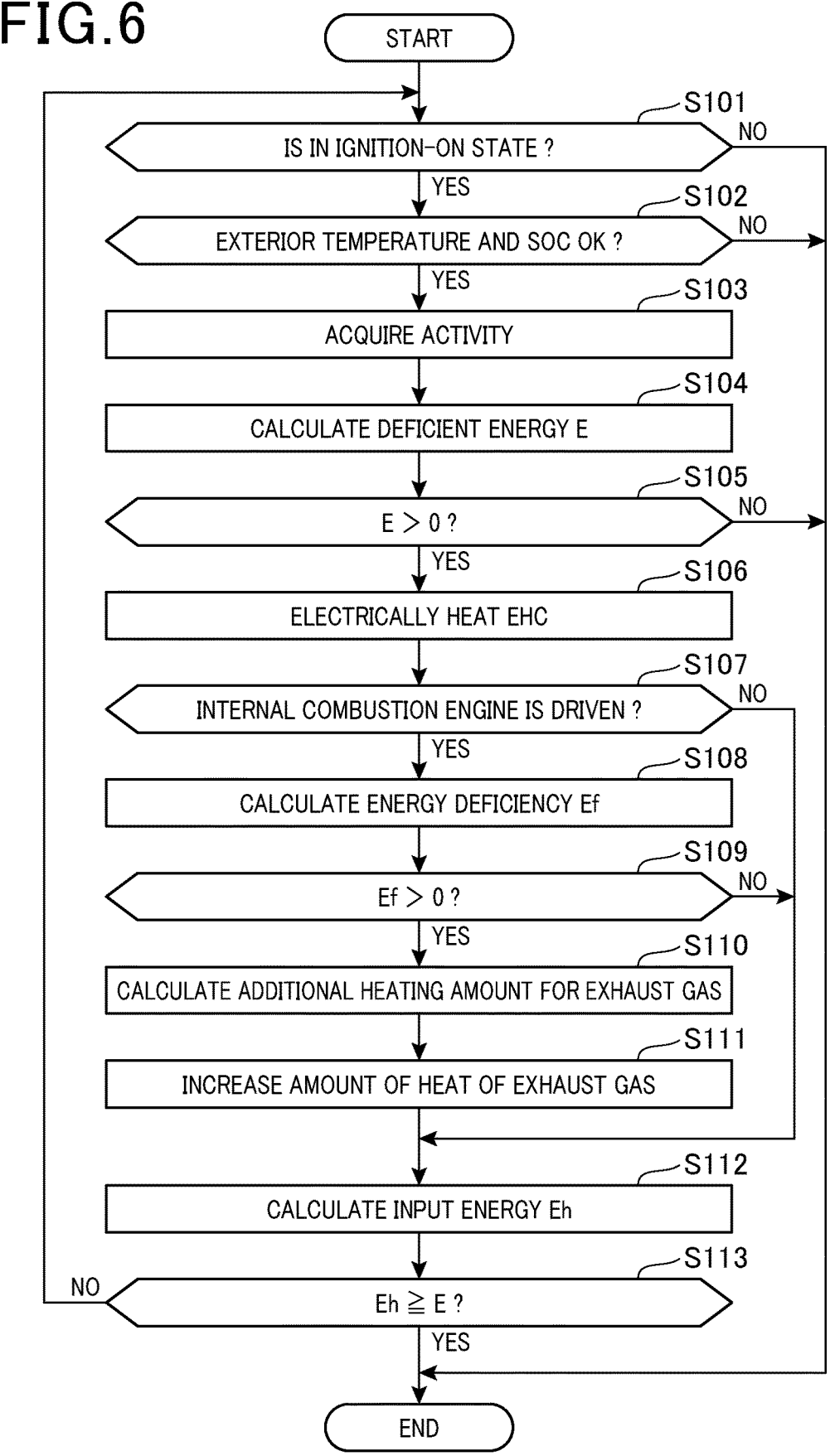
FIG. 6 is a flowchart illustrating a control routine for the exhaust gas purification system according to the exemplary embodiment.

Next, the following describes a control method, i.e. a control routine, to be carried out by the control apparatus 40 for the exhaust gas purification system 20 with reference to FIG. 6.

This control routine includes

1. An activity acquisition step, i.e. step S103, of acquiring a level of the activity of the exhaust purification catalyst 2. Heating control steps, i.e. steps S101 and S104 to S106, of causing the electric heating device to heat the exhaust purification catalyst in accordance with the level of the activity level of the exhaust purification catalyst, in response to an ignition-on operation, i.e. an activation operation, of the vehicle 3. Calculation steps, i.e. steps S107 to S110, of calculating the additional heating amount for the exhaust gas from the engine 10 in accordance with the level of the activity of the exhaust purification catalyst, on condition that the engine 10 is required to be started 4. A drive control step, i.e. step S111, of controlling the amount of heat of the exhaust gas from the engine 10 in accordance with the calculated additional heating amount.

First, in step S101, the control apparatus 40 determines whether the vehicle is in an ignition-on state. For example, the vehicle is in a ready-on state, i.e. a ready state, the control apparatus 40 determines that the vehicle is in the ignition-on state, i.e. activated state (YES in step S101). Upon determination that the vehicle is in the ignition-on state, the control routine goes to step S102. Otherwise, upon determination that the vehicle is not in the ignition-on state, the control apparatus 40 terminates the control routine.

In step S102, the control apparatus 40 refers to the exterior temperature and a value of the SOC of the high-voltage battery 38, and determines whether energization of the EHC 23 is possible based on the reference results. For example, the control apparatus 40 determines that energization of the EHC 23 is possible upon the exterior temperature being equal to or higher than a predetermined threshold temperature and the value of the SOC is equal to or higher than a predetermined threshold value. Upon determination that energization of the EHC 23 is possible (YES in step S102), the control routine goes to the step S103. Otherwise, upon determination that energization of the EHC 23 is not possible (NO in step S102), the control apparatus 40 terminates the control routine.

In step S103, the control apparatus 40 acquires the level of the activity of the exhaust purification catalyst, and thereafter, the control routine goes to step S104. For example, in step S103, the control apparatus 40 can obtain the level of the activity of the exhaust purification catalyst as a function of the temperature of the exhaust purification catalyst layer 21 measured by the temperature sensor 27, or can obtain the level of the activity of the exhaust purification catalyst as a function of the amount of a purification target component contained in the exhaust gas measured by at least one of the exhaust gas sensors 25 and 26.

In step S104, the control apparatus 40 calculates, as the energy deficiency E, energy that is required for the temperature T of the exhaust purification catalyst to have reached the totally active temperature Ta, and thereafter the control routine goes to step S105. In step S104, the control unit 40 for example calculates the energy deficiency E in accordance with a temperature difference ΔT between 1. An actual temperature of the exhaust purification catalyst, which is, for example, a temperature T1 measured at the execution of step S104

2. The totally active temperature Ta

That is, the control unit 40 for example calculates the energy deficiency E in accordance with the temperature difference ΔT, which is expressed by the following equation ΔT=Ta−T1

In step S105, the control apparatus 40 determines whether it is necessary to heat the exhaust purification catalyst based on energization of the EHC 23.

Upon determination that the energy deficiency E is higher than zero (E>0), the control apparatus 40 determines that it is necessary to heat the exhaust purification catalyst (YES in step S105), the control apparatus 40 performs energization of the EHC 23 to thereby heat the exhaust purification catalyst based on the energized EHC 23 in step S106.

Otherwise, upon determination that the energy deficiency E is equal to or lower than zero (E≤0), the control apparatus 40 determines that it is unnecessary to heat the exhaust purification catalyst (NO step S105), and thereafter, the control apparatus 40 terminates the control routine.

After execution of the operation in step S106, the control apparatus 40 determines whether the engine 10 is driven in step S107. Upon determination that the engine 10 is driven (YES in step S107), the control apparatus 40 calculates, as an energy deficiency Ef, a present value of the energy deficiency E in step S108. Otherwise, upon determination that the engine 10 is not driven (NO in step S107), the control apparatus 40 continuously performs heating of the exhaust purification catalyst based on the energized EHC 23.

In step S108, the control apparatus 40 is capable of calculating the energy deficiency Ef in the same approach as the above approach of calculating the energy deficiency E in step S104.

Specifically, the control apparatus 40 can obtain an actual temperature of the exhaust purification catalyst, which is, for example, a temperature T2 measured at the execution of step S108. Then, the control apparatus 40 can calculate the energy deficiency Ef in accordance with the temperature difference ΔT, which is expressed by the following equation ΔT=Ta−T2

After recalculation of the energy deficiency Ef in step S108, the control routine proceeds to step S109.

In step S109, the control apparatus 40 determines whether it is necessary to perform additional heating of the exhaust purification catalyst.

Specifically, the control apparatus 40 determines that it is necessary to perform additional heating of the exhaust purification catalyst upon determination that the energy deficiency Ef is greater than zero (Ef>0) (YES in step S109). Then, the control apparatus 40 carries out the following operation in step S110.

In step S109, the apparatus 40 determines that it is unnecessary to perform additional heating of the exhaust purification catalyst upon determination that the energy deficiency Ef is equal to or lower than zero (Ef≤0) (NO in step S109). Then, the control apparatus 40 carries out the following operation in step S112.

In step S110, the control apparatus 40 calculates the additional heating amount for the exhaust gas from the engine 10. For example, the control apparatus 40 calculates the additional heating amount as a function of the energy deficiency Ef.

For example, as illustrated in FIG. 3, when the energy deficiency Ef is greater than the energy level Es (Ef>Es), which represents the exhaust purification catalyst is inactive, the control apparatus 40 can set the additional heating amount to its maximum Wmax, for example, a value on the straight line L2 illustrated in FIG. 5(b), acceptable by the engine 10.

As another example, when the energy deficiency Ef is greater than zero and equal to or smaller than the energy level Es (0<Ef≤Es), which represents the exhaust purification catalyst is semi-active, the control apparatus 40 can change the additional heating amount in a curve such that the rate of change of the additional heating amount decreases as the energy deficiency Ef decreases.

Following the operation in step S110, the control apparatus 40 performs a control task of increasing the amount of heat of the exhaust gas in accordance with the additional heating amount calculated in step S110 in step S111. Thereafter, the control routine proceeds to step S112.

In step S112, the control apparatus 40 calculates input energy Eh that has been charged to the heating of the exhaust purification catalyst since the execution of step S104 to the present time of step S112. For example, the control apparatus 40 can calculate the input energy Eh in accordance with the electric power that has been supplied from the high-voltage battery 38 to the EHC 23 and temporal change of the temperature of the exhaust gas from the engine 10.

As another example, the control apparatus 40 can calculate the input energy Eh in accordance with a specific heat of the exhaust purification catalyst, and the temperature difference (T3−T1) between 1. An actual temperature of the exhaust purification catalyst, which is, for example, a temperature T3 measured at the execution of step S112
2. The temperature T1 of the exhaust purification catalyst measured at the execution of step S104

After execution of the operation in step S112, the control routine goes to step S113.

In step S113, the control apparatus 40 determines whether the heating of the exhaust purification catalyst has been completed.

Specifically, in step S113, the control apparatus 40 compares in magnitude the deficiency energy E calculated in step S103 with the input energy Eh calculated in step S112. The control apparatus 40 returns to the operation in step S101, and performs the control routine from the operation in step S101 upon determination that the input energy Eh is smaller than the deficiency energy E (Eh<E). Otherwise, upon determination that the input energy Eh is equal to or greater than the deficiency energy E (Eh≥E), the control apparatus 40 terminates the control routine.

In place of the operation in respective steps S112 and S113, the control apparatus 40 can determine whether the level of the activity of the exhaust purification catalyst is the totally active level, and determine whether the heating of the exhaust purification catalyst has been completed upon determination whether the level of the activity of the exhaust purification catalyst immediately before the operation in step S112 is the totally active level. Specifically, the control apparatus 40 can obtain the temperature T3 of the exhaust purification catalyst immediately before the operation in step S112, and determine whether the obtained temperature T3 is higher than the totally active temperature Ta.

Upon determination that the obtained temperature T3 is higher than the totally active temperature Ta (T3<Ta), the control apparatus 40 can return to the operation in step S101, and can perform the control routine from the operation in step S101. Otherwise, upon determination that the obtained temperature T3 is equal to or lower than the totally active temperature Ta (T3≥Ta), the control apparatus 40 can terminate the control routine.

Figure 7:
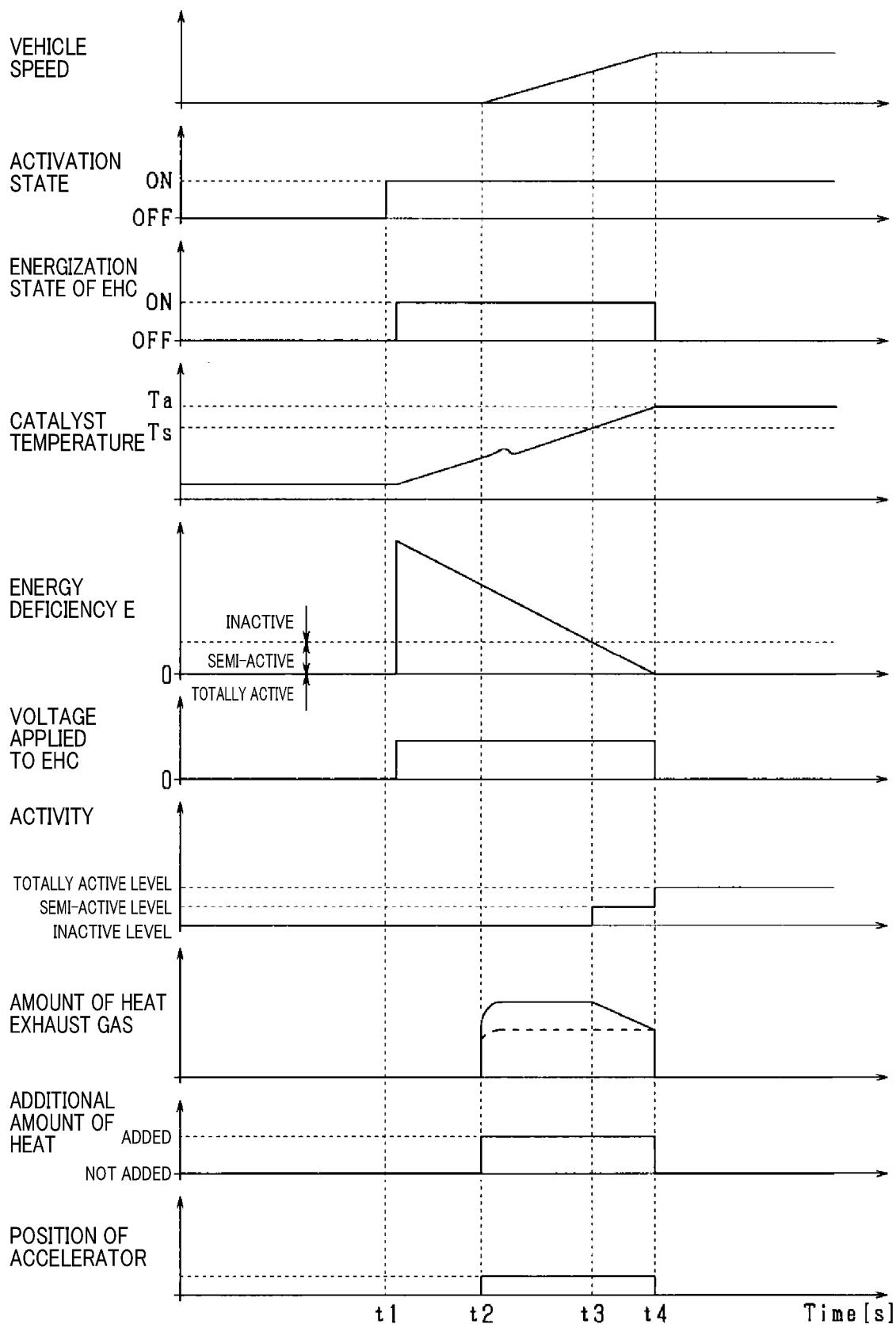
FIG. 7 is a timing chart illustrating how the exhaust gas purification system is worked in accordance with execution of the control routine.
Figure 8:
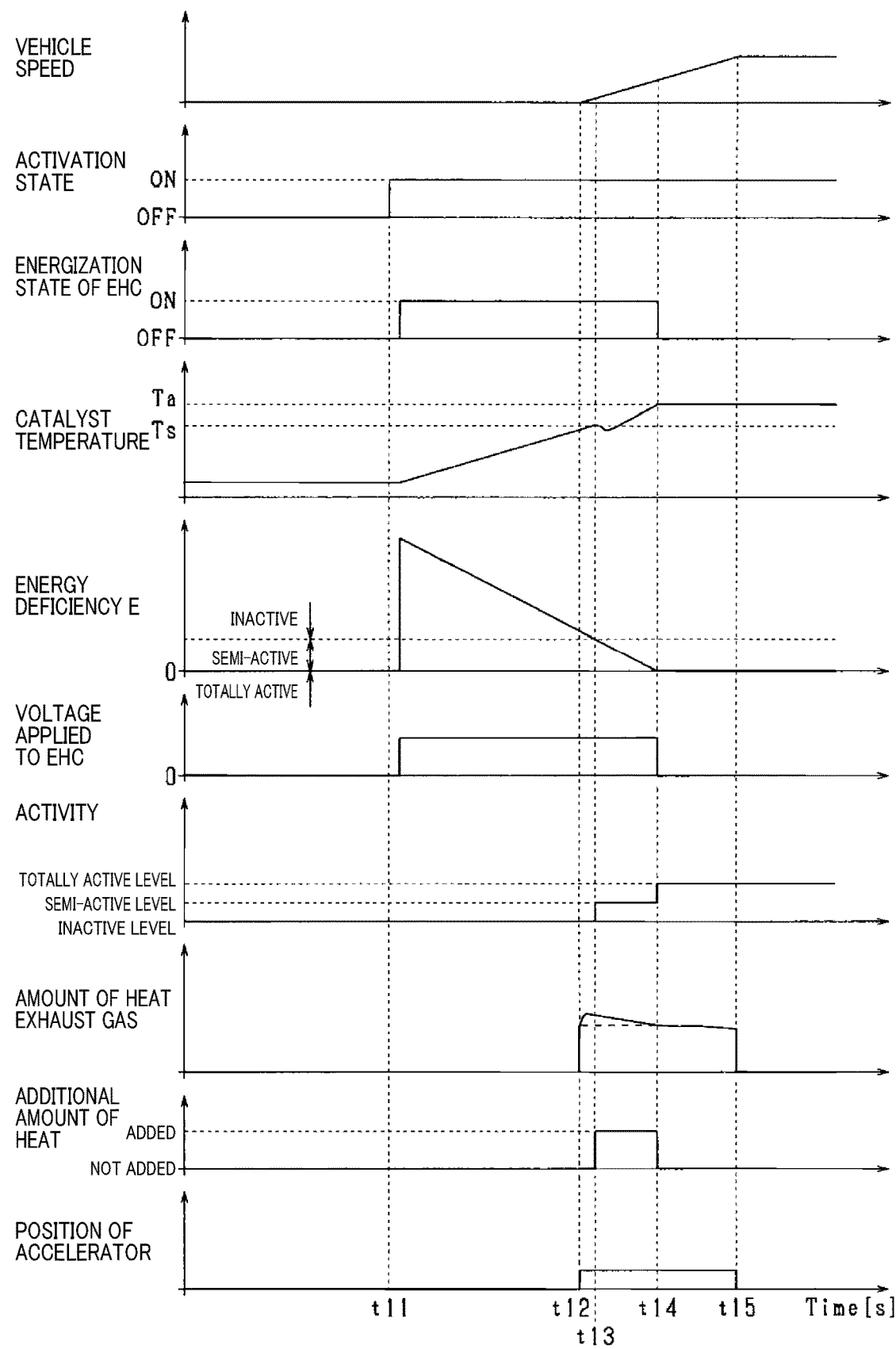
FIG. 8 is a timing chart illustrating how the exhaust gas purification system is worked in accordance with execution of the control routine.
Figure 9:
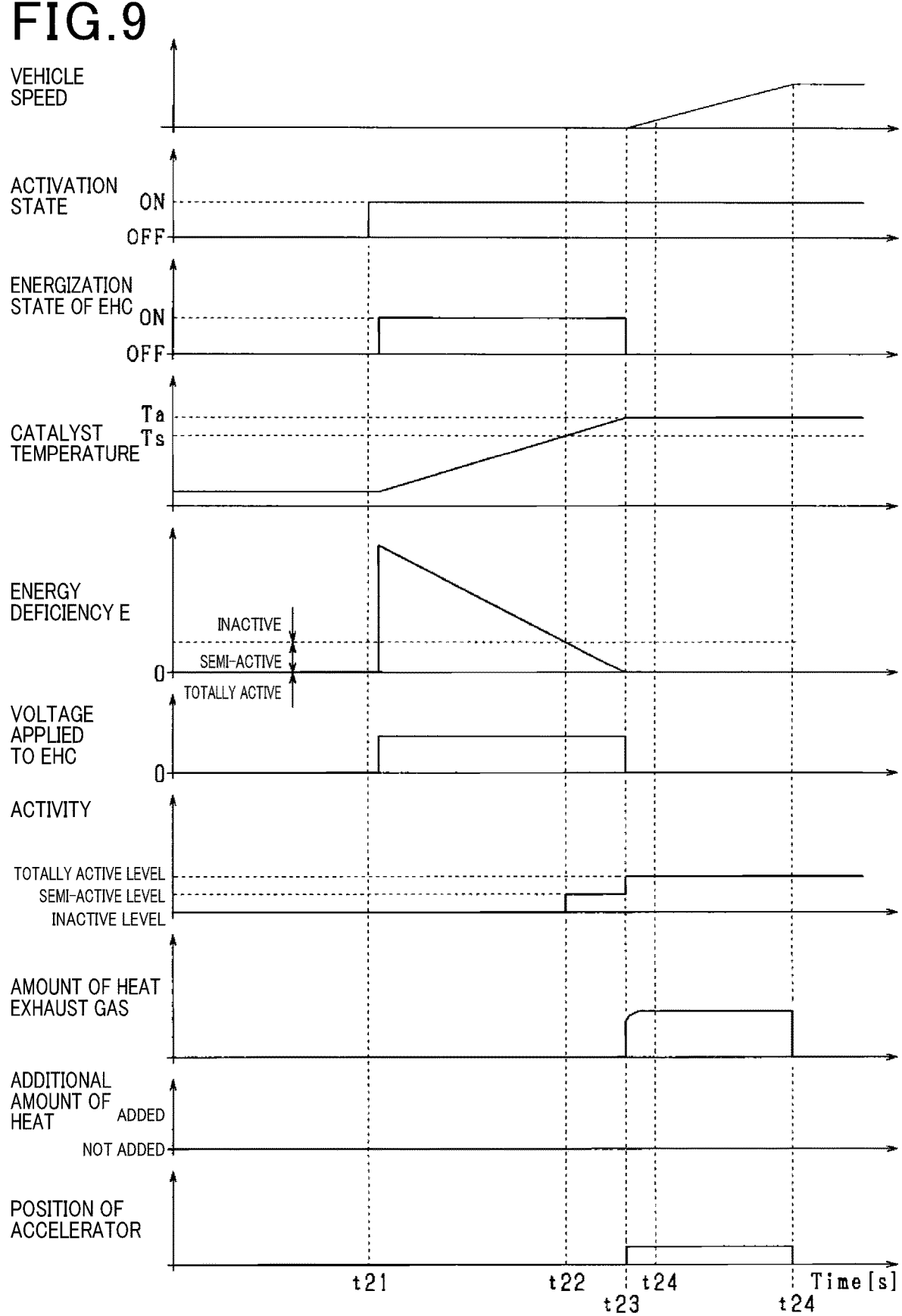
FIG. 9 is a timing chart illustrating how the exhaust gas purification system is worked in accordance with execution of the control routine.

Next, the following describes how the exhaust gas purification system 20 is worked in accordance with execution of the control routine with reference to respective timing charts of FIGS. 7 to 9. In each of the timing charts, the horizontal axis represents time, and the vertical axis represents, in the order from the top of the corresponding chart, 1. How the vehicle speed is changed over time
2. How the activation state, i.e. ignition-on state, of the vehicle is changed over time
3. How the energization state of the EHC 23 is changed over time
4. How the temperature of the exhaust purification catalyst layer 21 is changed over time
5. How the energy deficiency E is changed over time
6. How the voltage applied to the EHC 23 is changed over time
7. How the activity of the exhaust purification catalyst is changed over time
8. How the amount of heat of the exhaust gas is changed over time
9. Whether the additional amount of heat is added or not added is changed over time
10. How the actual position of the accelerator is changed over time FIG. 7 schematically illustrates these parameters in a case where the level of the activity of the exhaust purification catalyst is within the range of the inactive levels, FIG. 8 schematically illustrates these parameters in a case where the level of the activity of the exhaust purification catalyst is within the range of the semi-active levels. FIG. 9 schematically illustrates these parameters in a case where the level of the activity of the exhaust purification catalyst has reached the totally active level.

As illustrated in FIG. 7, the vehicle becomes in the ignition-on state at time t1, so that the energy deficiency E is calculated. As a result of the calculation, the exhaust purification catalyst is determined to be inactive and therefore heating of the exhaust purification catalyst is determined to be required. This causes energization of the EHC 23 to be performed. The continuous energization of the EHC 23 causes the temperature of the exhaust purification catalyst layer 21 to rise along with time.

At time t2, the accelerator is turned on, so that the engine 10 is required to be started. This causes the energy deficiency to be calculated. As a result of the calculation, the exhaust purification catalyst is determined to be inactive and the additional amount of heat to be added to the amount of heat of the exhaust gas is set to the maximum Wmax acceptable by the engine 10.

Note that, in FIG. 7, a dashed curve shows how the amount of heat is changed from the time t2 to time t4 while no additional amount of heat is added thereto. That is, the difference between the actual curve and the dashed curve represents the additional amount of heat to be added to the amount of heat of the exhaust gas.

The vehicle speed rises while the accelerator is on.

Both the EHC 23 and the exhaust gas from the engine 10 heat the exhaust purification catalyst layer 21 to thereby increase the temperature of the exhaust purification catalyst layer 21. This results in the temperature of the exhaust purification catalyst layer 21 having reached the semi-active temperature Ts at time t3. This causes the additional amount of heat for the exhaust gas from the engine 10 to substantially linearly decrease as the energy deficiency substantially linearly decreases.

The temperature of the exhaust purification catalyst layer 21 further rises so as to have reached the totally active temperature Ta at the time t4. At the time t4, the energy deficiency has reached zero, so that addition of heat to the exhaust gas from the engine 10 is stopped, and energization of the EHC 23 is stopped. At the time t4, the accelerator is turned off, so that the vehicle speed is set to a constant speed.

As illustrated in FIG. 8, the vehicle becomes in the ignition-on state at time t11, so that the energy deficiency E is calculated. As a result of the calculation, the exhaust purification catalyst is determined to be inactive and therefore heating of the exhaust purification catalyst is determined to be required. This causes energization of the EHC 23 to be performed. The continuous energization of the EHC 23 causes the temperature of the exhaust purification catalyst layer 21 to rise along with time.

At time t12, the accelerator is turned on, so that the engine 10 is required to be started. This causes the energy deficiency to be calculated. As a result of the calculation, the exhaust purification catalyst is determined to be inactive and the additional amount of heat to be added to the exhaust gas is set to the maximum Wmax acceptable by the engine 10.

Note that, in FIG. 8, a dashed curve shows how the amount of heat is changed from the time t12 to time t14 while no additional amount of heat is added thereto. That is, the difference between the actual curve and the dashed curve represents the additional amount of heat to be added to the amount of heat of the exhaust gas.

The vehicle speed rises while the accelerator is on.

Both the EHC 23 and the exhaust gas from the engine 10 heat the exhaust purification catalyst layer 21 to thereby increase the temperature of the exhaust purification catalyst layer 21. This results in the temperature of the exhaust purification catalyst layer 21 having reached the semi-active temperature Ts at time t13 immediately after the time t12. This causes the additional amount of heat for the exhaust gas from the engine 10 to substantially linearly decrease as the energy deficiency substantially linearly decreases.

The temperature of the exhaust purification catalyst layer 21 further rises so as to have reached the totally active temperature Ta at the time t14. At the time t14, the energy deficiency has reached zero, so that addition of heat to the exhaust gas from the engine 10 is stopped, and energization of the EHC 23 is stopped. While the accelerator is in the on state from the time t14 to time t15, the engine 10 is operated under predetermined operation conditions, so that a constant amount of heat of the exhaust gas is obtained, but, no additional amount of heat to be added to the exhaust gas prevents the temperature of the exhaust purification catalyst from rising. At time t15, the accelerator is turned off, so that the vehicle speed is set to a constant speed.

As illustrated in FIG. 9, the vehicle becomes in the ignition-on state at time t21, so that the energy deficiency E is calculated. As a result of the calculation, the exhaust purification catalyst is determined to be inactive and therefore heating of the exhaust purification catalyst is determined to be required. This causes energization of the EHC 23 to be performed. The continuous energization of the EHC 23 causes the temperature of the exhaust purification catalyst layer 21 to rise along with time.

The EHC 23 heats the exhaust purification catalyst layer 21 to thereby increase the temperature of the exhaust purification catalyst layer 21. This results in the temperature of the exhaust purification catalyst layer 21 having reached the semi-active temperature Ts at time t22. At that time, because no request for starting the engine 10 has occurred, no additional amount of heat is added to the exhaust gas from the engine 10.

The temperature of the exhaust purification catalyst layer 21 further rises so as to have reached the totally active temperature Ta at time t23. At the time t24, the energy deficiency has reached zero, so that energization of the EHC 23 is stopped.

At the time t24, the accelerator is turned on so that the engine 10 is required to be started. This causes the energy deficiency to be calculated. As a result of the calculation, the exhaust purification catalyst is determined to be totally active, so that the engine 10 is driven without any additional amount of heat for the exhaust gas.

While the accelerator is in the on state from the time t24 to the time t25, the engine 10 is operated under predetermined normal operation conditions, so that a constant amount of heat of the exhaust gas is obtained, but, no additional amount of heat to be added to the exhaust gas prevents the temperature of the exhaust purification catalyst from rising. At time t25, the accelerator is turned off, so that the vehicle speed is set to a constant speed.

As described above, the control apparatus 40 is configured to heat the exhaust purification catalyst in accordance with the activity of the exhaust purification catalyst as soon as possible in response to an ignition-on operation of the vehicle.

In particular, the calculation unit 44 is configured to calculate, in accordance with the activity of the exhaust purification catalyst, the additional heating amount for the exhaust gas from the engine 10, in response to the engine 10 being required to be started, and the drive control unit 41 controls the amount of heat of the exhaust gas from the engine 10 in accordance with the calculated additional heating amount.

This configuration makes it possible to suitably control, in accordance with the activity of the exhaust purification catalyst, both 1. The amount of heat to be applied by the EHC 23 to the exhaust gas
2. The amount of heat of the exhaust gas This therefore enables quick heating of the exhaust purification catalyst while enabling reduction in the fuel consumption.

Note that the exemplary embodiment has been described with a case where the control apparatus 40 is comprised of a single control unit, but the control apparatus 40 is not limited to this case.

For example, the control apparatus 40 can be comprised of a plurality of control units, which include: (a) a hybrid ECU for overall control of the whole of a hybrid vehicle, (b) an engine ECU for controlling the engine 10, and (c) an MG-ECU for controlling the inverter 37 to thereby control the MGs 31 and 32.

In this modification, the hybrid ECU can be configured to transmit control signals and/or data to the engine ECU and/or MG-ECU, and receive control signals and/or data from the engine ECU and/or the MG-ECU, thus controlling the engine 10 and the MGs 31 and 32.

One of the engine ECU and MG-ECU can be configured to control the power supply circuit 24 to thereby control energization power for the EHC 23. Alternatively, a special ECU can be provided for controlling the power supply circuit 24 to thereby control energization power for the EHC 23.

The present disclosure has been described in conformity with the exemplary embodiment. The present disclosure, however, is not limited to the exemplary embodiment and the above described structures. The present disclosure can include various modifications and deformations within the equivalent scope of the present disclosure. In addition, various combinations and configurations of one or more elements described above are within the scope or technical ideas of the present disclosure. The other combinations and configurations, which include one or more new elements are combined thereto, are also within the scope or technical ideas of the present disclosure.

What is claimed is:

1. A control apparatus for controlling an exhaust gas purification system, the exhaust gas purification system including:
   an exhaust purification catalyst disposed in an exhaust passage of an internal combustion engine of a vehicle; and
   an electric heating device for heating the exhaust purification catalyst based on supplied electric power,
   the control apparatus comprising:
   an activity acquisition unit configured to acquire an activity of the exhaust purification catalyst;
   a heating control unit configured to cause the electric heating device to initiate and continuously heat the exhaust purification catalyst until the activity of the exhaust purification catalyst becomes a totally active level in response to an ignition operation of the vehicle;
   a calculation unit configured to:
      calculate an additional heating amount for the exhaust gas from the internal combustion engine in response to the internal combustion engine being required to be started after start of heating of the exhaust purification catalyst by the electric heating device, the additional heating amount being required for the activity of the exhaust purification catalyst to become the totally active level;
      determine whether the activity of the exhaust purification catalyst is a non-activity level, a semi-activity level, or the totally active level in response to the internal combustion engine being required to be started; and
      adjust the additional heating amount tor the exhaust gas in accordance with determination of whether the activity of the exhaust purification catalyst is the non-activity level, the semi-activity level, or the totally active level;
   a drive control unit configured to control, in accordance with the additional heating amount for the exhaust gas adjusted by the calculation unit, an amount of heat of the exhaust gas from the internal combustion engine to accordingly heat the exhaust purification catalyst in parallel with heating of the exhaust purification catalyst by the electric heating device under control of the heating control unit.

2. The control apparatus according to claim 1, wherein:
   the calculation unit is configured to reduce the additional heating amount for the exhaust gas with an increase in the activity of the exhaust purification catalyst.

3. The control apparatus according to claim 1, wherein:
   the calculation unit is configured to calculate the additional heating amount for the exhaust gas heat in accordance with at least one of a speed of the vehicle or an acceleration of the vehicle.

4. The control apparatus according to claim 1, wherein:
   the calculation unit is configured to calculate the additional heating amount for the exhaust gas in accordance with an amount of a purification target component contained in the exhaust gas from the internal combustion engine.

5. A method of controlling an exhaust gas purification system that includes:
   an exhaust purification catalyst disposed in an exhaust passage of an internal combustion engine of a vehicle; and
   an electric heating device for heating the exhaust purification catalyst based on supplied electric power,
   the method comprising the steps of:
   acquiring an activity of the exhaust purification catalyst;
   initiating and continuously heating, using the electric heating device, the exhaust purification catalyst until the activity of the exhaust purification catalyst becomes a totally active level in response to an ignition operation of the vehicle;
   calculating an additional heating amount for the exhaust gas from the internal combustion engine in response to a request for starting the internal combustion engine, the additional heating amount being required for the activity of the exhaust purification catalyst to become the totally active level;
   determining whether the activity of the exhaust purification catalyst is a non-activity level, a semi-activity level or the totally active level in response to the internal combustion engine being required to be started;
   adjusting the additional heating amount for the exhaust gas in accordance with determination of whether the activity of the exhaust purification catalyst is the non-activity level, the semi-activity level, or the totally active level; and
   controlling, in accordance with the adjusted additional heating amount for the exhaust gas, an amount of heat of the exhaust gas from the internal combustion engine to accordingly heat the exhaust purification catalyst in parallel with heating of the exhaust purification catalyst by the electric heating device under control of the heating control unit.

6. The method according to claim 5, further comprising:
   reducing the additional heating amount for the exhaust gas with an increase in the activity of the exhaust purification catalyst.

7. The method according to claim 5, further comprising:
   calculating the additional heating amount for the exhaust gas heat in accordance with at least one of a speed of the vehicle or an acceleration of the vehicle.

8. The method according to claim 5, further comprising:
   calculating the additional heating amount for the exhaust gas in accordance with an amount of a purification target component contained in the exhaust gas from the internal combustion engine.

9. The method according to claim 5, further comprising:
   calculating the additional heating amount for the exhaust gas in accordance with an energy deficiency which is energy that is required for a temperature of the exhaust purification catalyst to have reached a totally active temperature.

10. The method according to claim 5, further comprising:
    calculating the additional heating amount for the exhaust gas in accordance with an amount of energy discharged from the exhaust purification catalyst layer.

11. The control apparatus according to claim 1, wherein:
    the calculation unit is configured to calculate the additional heating amount for the exhaust gas in accordance with an energy deficiency which is energy that is required for a temperature of the exhaust purification catalyst to have reached a totally active temperature.

12. The control apparatus according to claim 1, wherein:
    the calculation unit is configured to calculate the additional heating amount for the exhaust gas in accordance with an amount of energy discharged from the exhaust purification catalyst layer.

* * * * *